C. C. Manuel,
Stump Elevator.
N° 81,918. Patented Sep. 8, 1868.

Witnesses:
Wm. A. Morgan
G. C. Cotton

Inventor
C. C. Manuel
per Munn & Co.
Att'ys.

United States Patent Office.

CHARLES C. MANUEL, OF NORTH TROY, VERMONT, ASSIGNOR TO HIMSELF, WILLIAM G. ELKINS, AND O. N. ELKINS, OF SAME PLACE.

Letters Patent No. 81,918, dated September 8, 1868.

IMPROVED STUMP-EXTRACTOR.

*The Schedule referred to in these Letters Patent and making part of the same.*

TO ALL WHOM IT MAY CONCERN:

Be it known that I, CHARLES C. MANUEL, of North Troy, in the county of Orleans, and State of Vermont, have invented a new and improved Stump-Extractor and Remover; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

Figure 1:
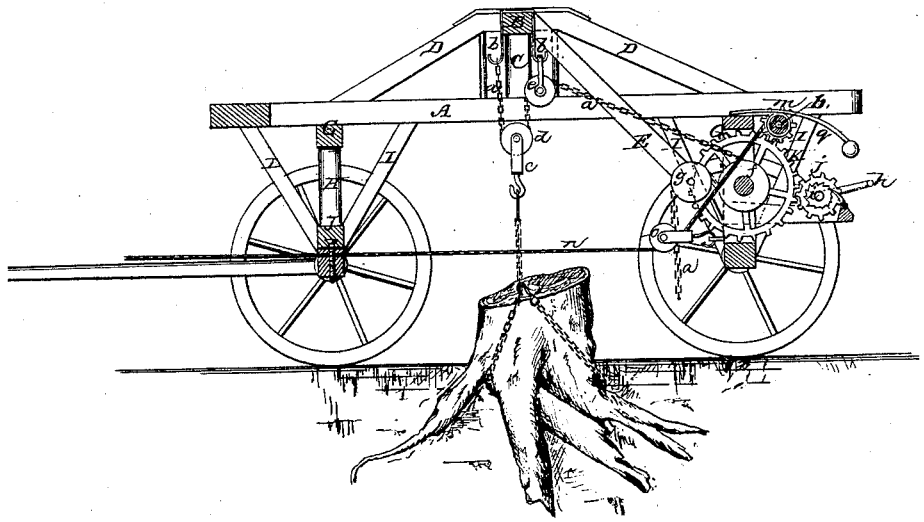
Figure 1 is a sectional side elevation of my invention.
Figure 2:
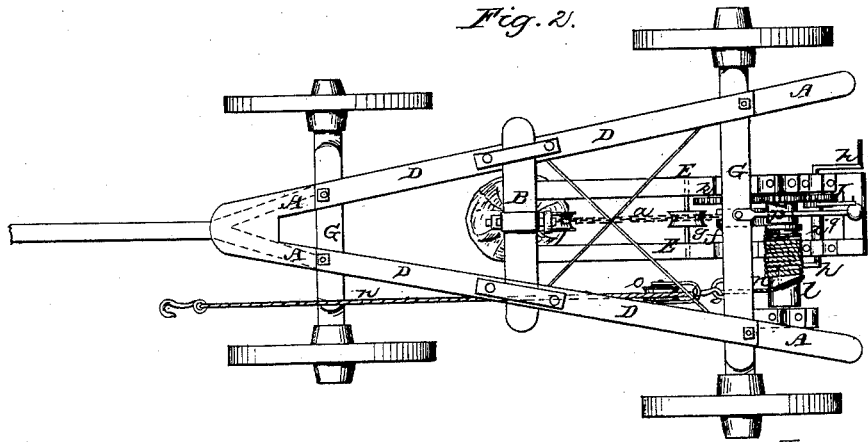
Figure 2 is a top or plan view of the same.

The object of this invention is to provide a machine for extracting or removing stumps, large stones, and other ponderous articles.

It consists in a strongly-braced frame, raised by uprights to a suitable height above the axle-trees of a stout running-gear or wagon, and provided with mechanism for extracting stumps or lifting from the ground any ponderous bodies, as large stones, logs, and the like.

In the drawings, A A are the main timbers of the frame, arranged and united in front to form a V-shaped frame, as shown.

B is a stout cross-timber, supported by two uprights, C, one being affixed to and rising from the middle point of each of the main timbers A.

D D D D are brace-timbers, arranged as shown, to brace the uprights C and the cross-timber B, which latter is further braced by timbers E, passing down between the main timbers, and resting on and bolted to the rear axle-tree of the machine.

The ends of these last-mentioned braces extend backward from the rear axle, and thus furnish the bed to support the mechanism employed in extracting or lifting.

The main timbers are bolted upon cross-beams G G, each of which latter is sustained by two uprights, H, from the axle-tree and bolster.

The frame is further braced at each end by the braces I, eight in all, and arranged as shown.

The frame is suitably strengthened by rods, bolts, and plates, as shown.

The chain $a$ depends from a hook, $b$, affixed strongly to the cross-timber B.

A sheave, $d$, having a hook, $c$, suspended from the ends of its axis-pin, rides in a bight in the chain in front of a sheave, $e$, attached to a hook, $b'$, affixed on the opposite side of the main cross-timber B, from the hook $b$.

The bight in which pulley or sheave $d$ rides is formed by the chain $a$, passing down and up over the pulley or sheave $e$, from which latter it passes down and around a broad roller, $f$, hugging the same closely for two-thirds of its circumference, and thence passing off on a pulley or sheave, $g$, suitably arranged between the braces E, to cause the chain to hug the drum.

From the pulley $g$ the chain hangs vertical, from its own gravity.

The face of the roller $f$ is formed with recesses, in each of which a link of the chain fits, so that if the chain is made by any pulley, as $g$, to clasp at least one-half of its circumference, the chain cannot slip on the roller when sustaining the greatest strain.

The roller is of iron, and its reduced ends have bearings in stout iron pillow-blocks, affixed to the braces E, between which the chain passes, and across which the roller is arranged.

I employ two methods to revolve the roller, in extracting stumps or lifting heavy bodies.

The first is a winch, having crank-handles $h\ h$ at each end of its shaft, $i$, which latter has its bearings in pillow-blocks affixed to the rear extensions of the braces E, as shown. This winch-shaft bears a pinion, $j$, and ratchet-wheel, as shown, the ratchet-wheel catching against a suitable pawl.

The pinion $j$ engages with a large cog-wheel, $k$, mounted on the roller $f$, and concentric with it.

Now, if the strain required be not very great, the winch is employed, and the chain $a$ wound, to shorten the bight, by hand; but if a greater strain is required to be exerted, as in extracting a large stump, the drum $l$, having wound thereon a rope, $n$, is used.

The drum bears a concentric pinion, $m$, which engages with the cog-wheel $k$, before mentioned.

The rope, after leaving the drum, passes downward and under a sheave or pulley, $o$, attached to the rear axle-tree, as shown. This pulley brings it in proper line from the ground, so that a horse or other draught-animal may be used to produce the power required.

A ratchet-clutch and lever, lettered $p$ and $q$, respectively, are employed, to throw the drum in gear with its pinion when the drum and rope are to be used, and to throw the same out of gear when not required.

The manner of arranging the chain, when in the act of extracting a stump, is shown, the stump being shown in red color.

When the stump is extracted or stone lifted, a team can be hitched to the machine and drawn to any locality where the stone or stump is to be deposited.

The front axle-tree is pivoted, by a king-bolt, to a short bolster, J, from which the uprights H and front braces I arise.

I claim as new, and desire to secure by Letters Patent—

1. The arrangement of the main timbers A A and their accessory cross-beam B, braces D and E, uprights C and H, cross-beams G, bolster J, when mounted on four wheels, and constituting the frame of a machine for extracting and removing stumps and other heavy bodies, all substantially as shown and described, and for the purpose set forth.

2. The arrangement of the chain $a$ and its accessory sheaves or pulleys $d\ e\ g$, and hooks $b\ b'\ c$, and roller $f$, in combination with a frame mounted on wheels, substantially as described, and any suitable gearing for actuating the said chain, all as and for the purpose set forth.

3. The combination, in a stump-extractor, of the accessory gearing $k\ j\ h\ l\ m$, and rope $n$, all arranged to operate substantially as and for the purposes set forth.

CHARLES C. MANUEL.

Witnesses:
   T. J. SARTWELL,
   H. C. WILSON.